United States Patent [19]

Lee

[11] Patent Number: 5,583,708
[45] Date of Patent: Dec. 10, 1996

[54] CIRCUIT FOR DETECTING UNRECORDED PORTION OF RECORDING MEDIUM

[75] Inventor: Kwang-heui Lee, Suwon, Rep. of Korea

[73] Assignee: Samsung Electronics Co., Ltd., Kyungki-do, Rep. of Korea

[21] Appl. No.: 211,530

[22] PCT Filed: Nov. 30, 1992

[86] PCT No.: PCT/KR92/00070

§ 371 Date: Apr. 5, 1994

§ 102(e) Date: Apr. 5, 1994

[87] PCT Pub. No.: WO94/12982

PCT Pub. Date: Jun. 9, 1994

[30] Foreign Application Priority Data

Nov. 23, 1992 [KR] Rep. of Korea ............... 92-22085

[51] Int. Cl.$^6$ ............................................. G11B 5/09
[52] U.S. Cl. ................................... 360/50; 360/51
[58] Field of Search ........................... 360/49, 50, 51; 369/59

[56] References Cited

U.S. PATENT DOCUMENTS

| | | | |
|---|---|---|---|
| 4,081,844 | 3/1978 | Devore et al. | 360/50 X |
| 4,757,406 | 7/1988 | Stewart et al. | 360/50 X |
| 4,758,906 | 7/1988 | Culp | 360/50 X |
| 4,833,551 | 5/1989 | Song | 360/77.05 |

*Primary Examiner*—W. C. Kim
*Attorney, Agent, or Firm*—Sughrue, Mion, Zinn, Macpeak & Seas

[57] ABSTRACT

Disclosed is a circuit for detecting an unrecorded portion of a recording medium, which has a window counting portion (10) for receiving an input signal, for recognizing if the input signal comes from an unrecorded portion of the recording medium and for counting a predetermined time to generate a window signal. The circuit also has a sync signal generator (20) which is enabled by the window signal, in which, if the number of pulses of the input signal equals or exceeds a predetermined number, the generator recognizes that the current input signal comes from a data region of the recording medium and therefore generates a sync signal. If the number of pulses of the input signal is less than the predetermined number of pulses, the generator recognizes that the current input signal is due to noise from an unrecorded region of the recording medium, and therefore does not generate the sync signal. The unrecorded portion is accurately detected since no sync signals are generated due to noise included in the unrecorded portion of the recording medium.

8 Claims, 2 Drawing Sheets

[5,583,708]

CIRCUIT FOR DETECTING UNRECORDED PORTION OF RECORDING MEDIUM

TECHNICAL FIELD

The present invention relates to magnetic storage devices, and more particularly, to a circuit for detecting an unrecorded portion of a magnetic recording medium.

BACKGROUND ART

In general, a magnetic recording medium includes a sector identification code for distinguishing one sector from another. In addition, unrecorded portions are provided between respective sectors to separate one sector from the next. It should be noted that, since noise can be generated in these unrecorded portions of the magnetic recording medium, an appropriate sync signal may not be generated at the exact starting point of a sector. That is, the noise generated in the unrecorded portion may be mistaken for the starting point of a sector, by the playback circuit, and, as a result the sync signal may be generated in the unrecorded portion.

FIG. 1A represents the conventional data recording format of a hard disk.

In FIG. 1A, a post-amble portion exists from an end location ENDS to of a sector a starting point of an unrecorded portion DC-GAP, sequentially followed by an unrecorded portion, a pre-amble portion and a data portion of the next sector.

FIG. 1B shows the location where a normal sync signal should be generated when ready a conventional hard disk. As be seen from the figure, the normal sync signal is generated at a predetermined point of the pre-amble portion.

FIG. 2 shows the location where a sync signal is generated in reading a conventional hard disk when one or two noise pulses included in the unrecorded portion are mistaken for a data signal. Thus a conventional unrecorded portion detecting circuit of the recording medium erroneously generates a sync signal by recognizing as data pulses the noise pulses in the unrecorded portion of the recording medium.

DISCLOSURE OF THE INVENTION

Therefore, to solve the above problems, it is an object of the present invention to provide a circuit for detecting unrecorded in which, when portions of a recoding medium unrecorded portion is detected, a starting point of a sector is accurately detected by ignoring noise pulses, thereby generating a desired sync signal.

To accomplish the above object of the present invention, there is provided a circuit for detecting an unrecorded portion of a recording medium, comprising:

window counting means for receiving a signal, for recognizing whether the signal comes from an unrecorded portion of the recording medium and for generating a window signal by counting a predetermined time; and sync signal generating means which is enabled by the window signal, in which, if the number of pulses of the input signal is not less than a predetermined number, said sync signal generating means recognizes that the current input signal comes from a data region of the recording medium and generates a sync signal, while, if the number of pulses of the input signal is not more than a predetermined number, said sync signal generating means recognizes that the current input signal comes from the unrecorded region of the recording medium, fails to generate the sync signal.

BRIEF DESCRIPTION OF THE DRAWINGS

Other features and advantages of the present invention will become apparent from the following description of the invention which refers to the accompanying drawings.

DETAILED DESCRIPTION OF THE INVENTION

The preferred embodiment of an unrecorded portion detecting circuit according to the present invention will be described below in more detail with reference to the accompanying drawings.

Figure 1A:
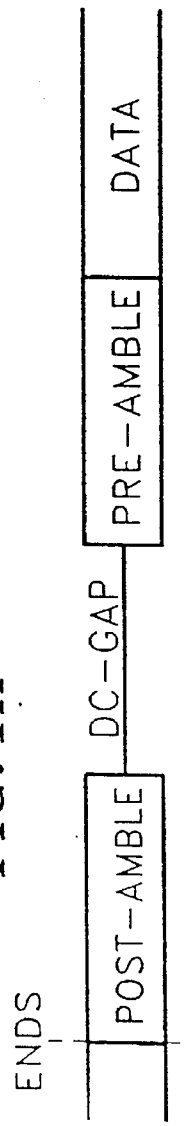
FIG. 1A represents a conventional data recording format for a hard disk.
Figure 1B:
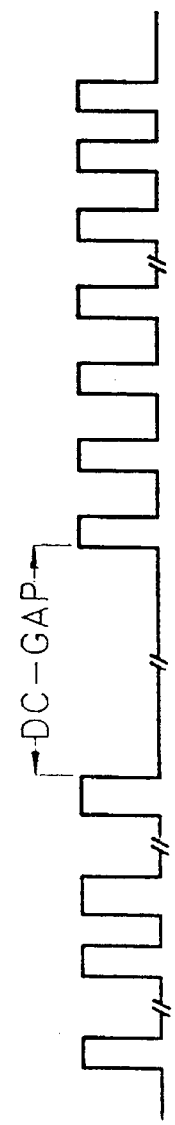
FIG. 1B shows the location where a sync signal should be generated when a reading conventional hard disk.
Figure 2:
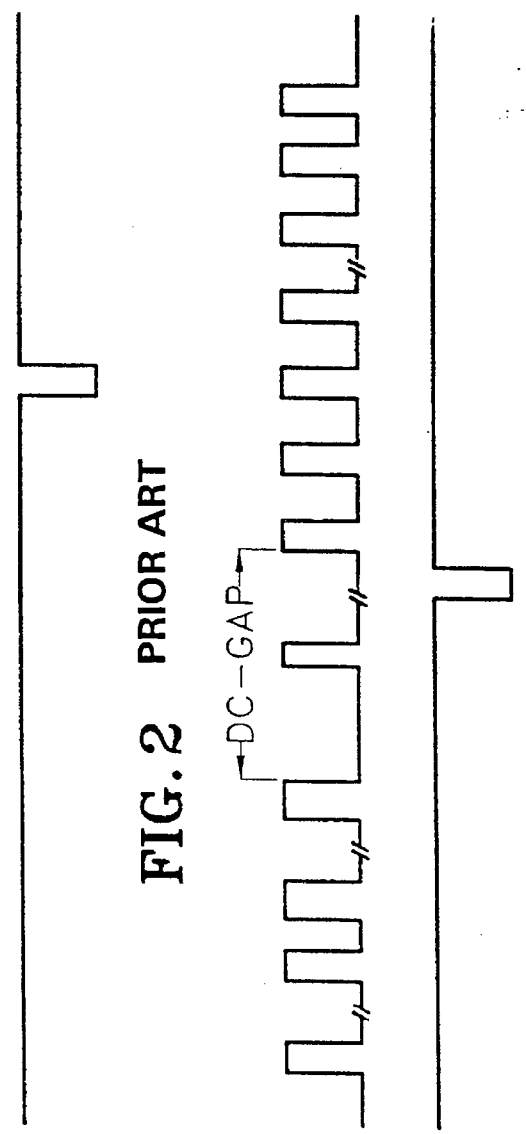
FIG. 2 shows the location where a sync signal is in fact generated in a read operation of conventional hard disk when one or two noise pulses included in the unrecorded portion are mistaken for data signals.
Figure 3:
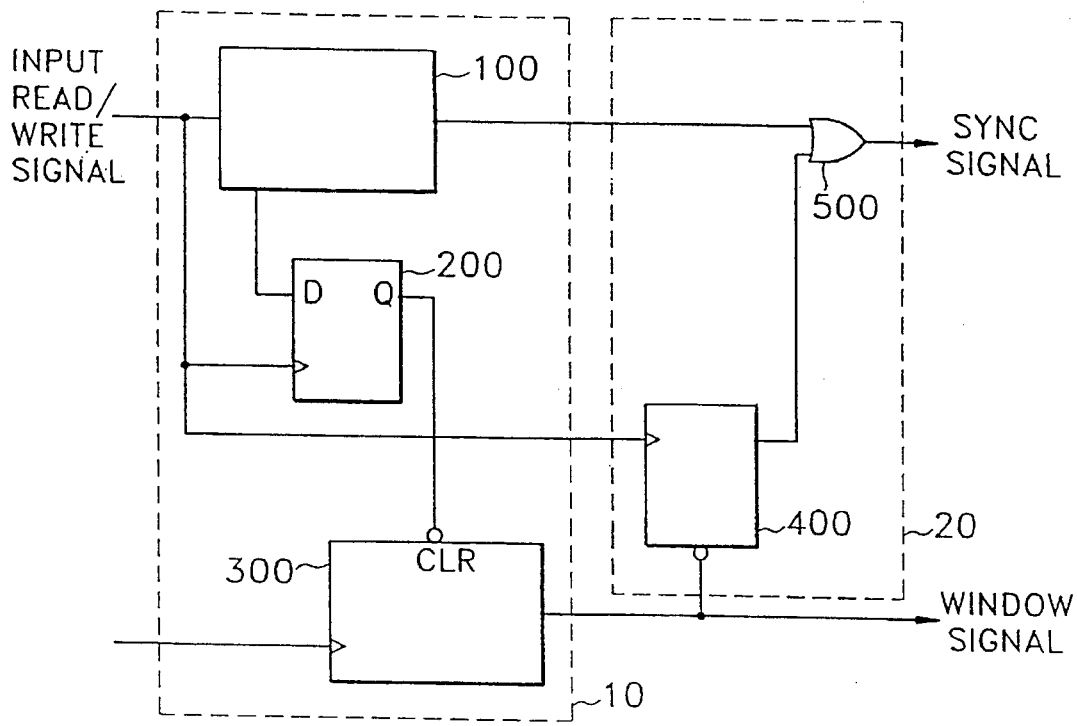
FIG. 3 is a block diagram of one embodiment of an unrecorded portion detecting circuit according to the present invention.

In FIG. 3, an unrecorded portion detecting circuit according to the present invention comprises a window counting portion 10 for receiving a read/write pulse signal, for recognizing whether the read/write signal comes from an unrecorded portion of a recording medium and for generating a window signal by counting a predetermined time in response to a clock signal. The circuit also comprises and a sync signal generator 20 which is enabled by the window counting portion 10 for accurately generating a sync signal by determining if the number of pulses of the read/write signal is not less than a predetermined number of pulses.

Window counting portion 10 comprises unrecorded portion recognition device 100 for receiving the read/write signal and determining if the signal comes from the data region or the unrecorded region of the recording medium. It further includes a D-type flip-flop 200 which has a dam input terminal D for receiving the output of the unrecorded portion recognition device 100 and a clock terminal for receiving the read/write signal. A window forming device 300 in the window counting portion 10, which has a clear terminal CLR for receiving the output of D-type flip-flop 200 and a system clock terminal, is enabled by the system clock and counts a predetermined time so as to form a window by performing a transition of a pulse state.

Sync signal generator 20 comprises a pulse counter/sync generator 400 having a clock terminal for receiving the read/write signal and a clear terminal cleared by the output of window forming device 300, thereby counting the number of pulses of the input signal, to accordingly generate a sync signal. It further includes an OR gate 500 for receiving the outputs of both the unrecorded portion recognition device 100 and the pulse counter/sync generator 400, to logically sum both the signals and to accordingly generate a sync signal.

Figure 4:
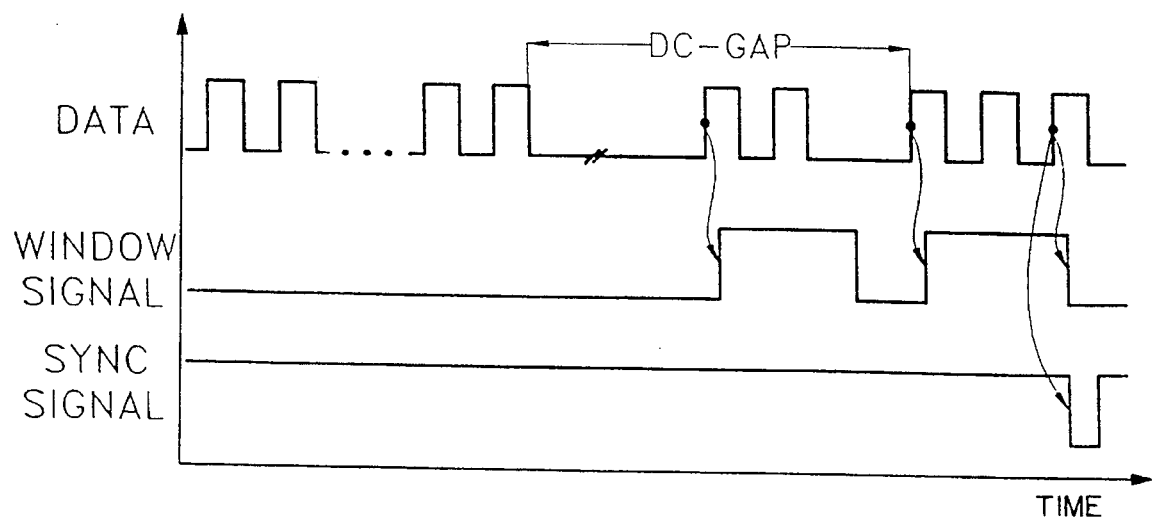
FIG. 4 is a timing diagram for explaining the operation of the unrecorded portion detecting circuit shown in FIG. 3.

FIG. 4 is a timing diagram for explaining the operation of the preferred embodiment of the unrecorded portion detecting circuit shown in FIG. 3.

In FIGS. 3 and 4, if the number of continuous pulses input less than or equal to two, it is assumed that the input pulses are noise. Unrecorded portion recognition device 100 receives dam which has been read out from the magnetic recording medium and recognizes that the input signal comes from the unrecorded portion of the magnetic recording medium. D-type flip-flop 200 receives the output of unrecorded portion recognition device 100 and then, if the input signal is received through the clock terminal, a pulse is generated. Window forming 300 counts a predetermined time in response to the system clock and generates the window signal, if the output of D-type flip-flop 200 is input to the clear terminal CLR. Here, the above predetermined time is a time during which three pulse signals can be input. As shown in FIG. 4, window forming device 300 detects the rising edge of a first noise pulse of the input signal included in the unrecorded portion to generate the rising edge of a window signal, and then counts a predetermined time to generate a falling edge of the window signal. Pulse counter/sync generator 400 generates a sync signal if the number of pulses of the signal input during an enabled period of the output of window forming device 300 is more than or equal to three, while pulse counter/sync generator 400 recognizes the input signal as noise so as not to generate the sync signal if the number of pulses of the signal input during the same period is less than or equal to two. That is, pulse counter/sync generator 400 detects a rising edge of the third pulse and generates a sync signal when it is determined that three pulses are input. Accordingly, logical summing device 500 outputs the sync signal only when the output of pulse counter/sync generator 400 is generated.

In this embodiment generated sync signal is generated the slightly delayed from the desired sync signal timing. Thus, it is necessary to add a sync signal correction circuit for synchronizing the sync signal appearing at the output side of logical summing device 500 shown in FIG. 3 To the desired sync signal timing. By doing so, correction of the sync signal is performed simply.

The above-described embodiment has been explained under the assumption that if only one or two pulses are input, the input pulses are noise. However, in other embodiments, both the window counting device and the sync signal generator may form window signals for measuring input signals equal to or exceeding a predetermined number of pulses then count the number of the input pulses, and determine whether or not the input pulses are noise.

The above-described unrecorded portion detecting circuit according to the present invention counts the predetermined time to form the window signal in window forming device 300, and generates the sync signal if a predetermined number of pulses or more are input within the counted interval in pulse counter/sync generator 400. Corresponding, & few than the predetermined number of pulses are input, they are determined to be noise and, as a result the sync signal is not generated.

As described above, the unrecorded portion detecting circuit according to the present invention accurately detects the unrecorded portion of a recording medium by not generating a sync signal in response to noise included in the unrecorded portion of the recording medium. Accordingly, the present invention can improve reliability of electronic products requiring accurate synchronization.

The present invention can be widely applied in the field of the electronic household products in which signals are recorded and reproduced using recording media.

I claim:

1. A circuit for detecting an unrecorded portion of a recording medium, comprising:

window counting means for receiving an input signal, for recognizing whether the input signal comes from an unrecorded portion of the recording medium and for generating a window signal corresponding to a predetermined time; and sync signal generating means which is enabled during the window signal, in which, if a number of pulses of the input signal during the window signal is not less than a predetermined number, said sync signal generating means recognizes that the input signal comes from a data region of the recording medium and generates a sync signal, while, if the number of pulses of the input signal during the window signal is greater than zero but less than the predetermined number, said sync signal generating means recognizes that the input signal comes from the unrecorded region of the recording medium, and omits generating the sync signal, wherein the predetermined number is at least equal to three.

2. The circuit for detecting an unrecorded portion of a recording medium according to claim 1, wherein said window counting means comprises unrecorded portion recognition means for receiving the input signal and recognizing whether the input signal comes from the unrecorded portion of the recording medium, storage means for storing an output of said unrecorded portion recognition means and generating the output of said unrecorded portion recognition means in response to the input signal, and window forming means, which is enabled by the output of said storage means, for counting the predetermined time in response to a predetermined clock to form the window signal.

3. The circuit for detecting an unrecorded portion of a recording medium according to claim 2, wherein said sync signal generating means comprises a pulse counter and sync generator, which is enabled in response to the window signal of said window forming means, for receiving the input signal and then generating a certain pulse signal if the predetermined number of the pulses is input, or, on the other hand then omitting generating the certain pulse signal if the predetermined number of the pulses fails to be input, and means for logical summing the outputs of both said unrecorded portion recognition means and said pulse counter and sync generator, to thereby generate the sync signal.

4. The circuit for detecting an unrecorded portion of a recording medium according to claim 2, wherein said window forming means detects a rising edge of a first noise pulse included in the unrecorded portion, then generates a rising edge of the window signal, and then, after the predetermined time, generates a falling edge of the window signal.

5. The circuit for detecting an unrecorded portion of a recording medium according to claim 1, wherein said sync signal generating means comprises:

a pulse counter and sync generator for receiving the input signal and the window signal, and then generating a certain pulse signal only if at least the predetermined number of the pulses is input during the predetermined time corresponding to the window signal.

6. A circuit for detecting a data region following an unrecorded region on a recording medium, comprising:

a first circuit portion having an input for read pulse signals reproduced from the recording medium and having circuit elements which process the read pulse signal to output an output signal indicative of the unrecorded region and which output a window signal clocked to the read pulse signal and lasting a predetermined amount of time; and a second circuit portion, which counts the number of read pulse signals during the predetermined amount of time corresponding to the window signal, and which outputs a sync signal only if the output signal is received and if the number of counted read pulse signals is at least equal to a predetermined number, and fails to output a sync signal even if the number of counted read pulse signals is greater than zero but less than the predetermined number, wherein the predetermined number is at least equal to three.

7. A method for detecting a data region following an unrecorded region on a recording medium, by outputting a sync signal, comprising the steps of:

reading the recording medium;

analyzing input pulse signals read during said reading step, and outputting an output signal whenever the input pulse signals originate from an unrecorded portion of the recording medium;

counting the number of input pulse signals read during a window period to obtain a count of the input pulse signals;

only if the count of the input pulse signals exceeds a predetermined number, outputting the sync signal in response to the output signal; and even if the count of the input pulse signals is greater than zero but no more than the predetermined number, refraining from outputting the sync signal in response to the output signal, wherein the predetermined number is at least equal to two.

8. The method according to claims 7, further comprising the step of:

generating the window period by counting a predetermined period of time commencing with detection of a first one of the input pulse signals originating from the unrecorded portion.

* * * * *